SELECTION MATRIX FOR FIXED STORAGE SYSTEMS
Filed Feb. 27, 1968 3 Sheets-Sheet 1
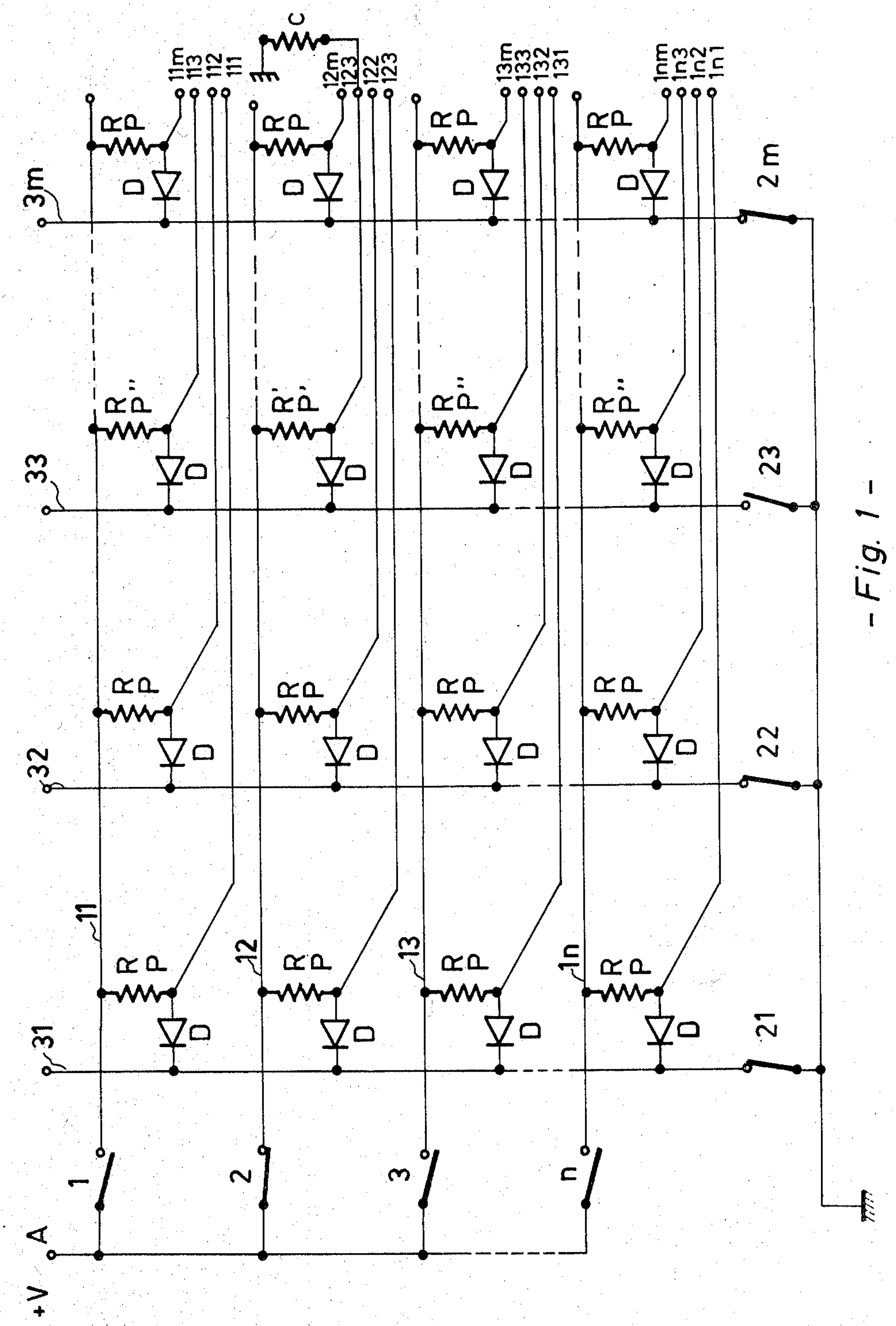
- Fig. 1 -
INVENTOR.
Franco FILIPPAZZI
By George V. Eltgroth and
Joseph B. Forman

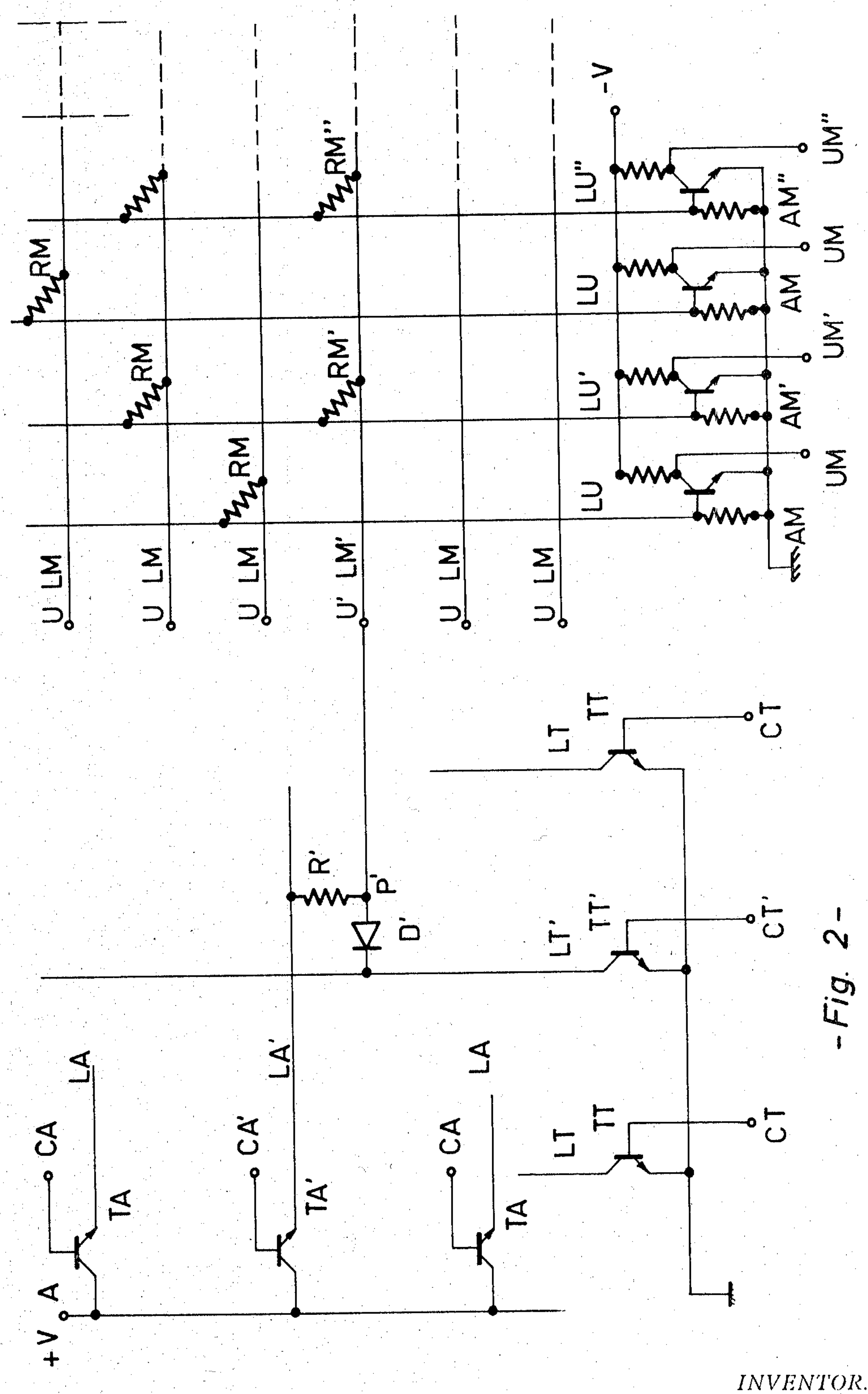
-Fig. 2-
INVENTOR.
Franco FILIPPAZZI,
By George V. Eltgroth and Joseph B. Forman

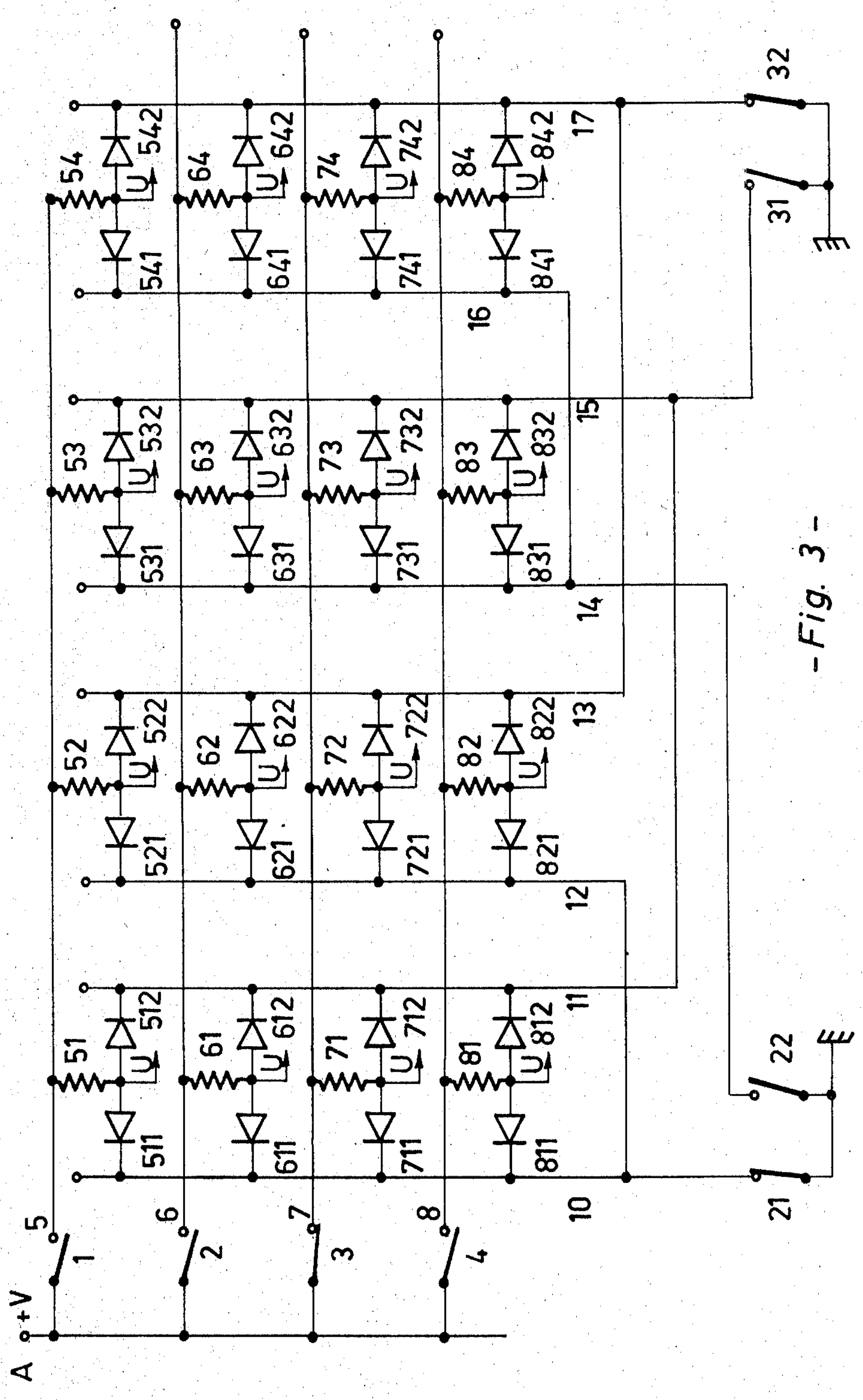
-Fig. 3-
INVENTOR.
Franco FILIPPAZZI
By George V. Eltgroth and Joseph B. Forman 3,555,511

SELECTION MATRIX FOR FIXED STORAGE SYSTEMS

Franco Filippazzi, Milan, Italy, assignor to General Electric Information Systems Italia S.p.A., Caluso, Turin, Italy, a corporation of Italy Filed Feb. 27, 1968, Ser. No. 709,598
Claims priority, application Italy, Feb. 28, 1967, 13,132/67
Int. Cl. H04q *3/50*
U.S. Cl. 340—166 6 Claims

ABSTRACT OF THE DISCLOSURE

The invention relates to a matrix for selecting an output circuit by selectively switching one of a plurality of input lines to one terminal of an input circuit and selectively retaining all but one of a plurality of input lines to the other terminal of the input circuit, the input lines being bridged by impedance and rectifier elements and one of the output leads for each output circuit being taken at a point common to an impedance-rectifier element circuit.

The present invention relates to a matrix arrangement for selecting circuit elements, such as input lines of fixed storage systems, of the type wherein selective connections between a set of input lines and a set of output lines is made by means of resistors, diodes, or capacitors.

According to a prior art method for selecting one line out of N lines for permitting a current flow through the selected line only, two sets of conductors are arranged as rows and columns of a matrix pattern, each conductor being provided with a switch. Each line to be selected is connected by one terminal to a row conductor and by the other terminal to a column conductor. By closing a row switch and a column switch, a circuit is completed including only the selected conductors through which the current may flow. In this case the current requirement is equal to the current flowing through the line, and the number of switches is approximately equal to $2\sqrt{N}$, if the matrix is square. Such disposition is currently used in selecting the memory lines in magnetic core storages and is extensively explained, for example, in the book "Square Loop Ferrite Circuitry" by C. J. Quartly, London (1962), page 83 and following.

This method cannot be used with storage systems such as utilize fixed resistor, diode or capacitor memories of the type described, for example, in the book by W. Renwick, Digital Storage Systems, SPON, London (1964), page 136 and following—wherein the input lines have only one terminal available for access. Therefore, either a switch must be provided for each input line, which means a very expensive and scarcely reliable arrangement, or a diode matrix of the type known as a "decoder" may be used, whereby, by selectively opening and closing a number of grounding switches, all output terminals with the exception of one, are placed at ground potential, and only the selected one is at a "live" potential. If N is the number of terminals, the number of switches used is approximately $\log_2 N$. This arrangement calls for very heavy current consumption, which is approximately N times the current flowing from the selected terminal in the selected load. The theory of such a selection matrix is developed in the article "Rectifier Network for Multiposition Switching" by D. R. Brown and N. Richester, Proceedings of the IRE, February 1949, pages 139 and following.

Another known device provides a selection matrix using magnetic cores as pulse transformers. This arrangement is somewhat complicated and expensive, as it requires a pulse transformer for each input line, and, in addition, approximately $2\sqrt{N}$ switches.

It is an object of the present invention to provide a simple reliable and inexpensive device for selecting one out of N one-terminal circuit elements using a number of switches approximately equal to $2\sqrt{N}$, or less, without using inductive devices, and with reduced current consumption. It includes a first plurality of selection lines, called feed lines, and associated feed switches, of which only one is closed, and at least a second plurality of selection lines, called ground lines and associated ground switches, of which only one is open. Each feed line is connected to all ground lines by a connecting circuit including a resistor and a diode, the output terminal to be selected being connected to the point common to the resistor and the diode. The terminal connected to the connection circuit pertaining to the feed line whose feed switch is closed, and to the ground lines whose ground switch is open, is the only one having a definite potential higher than ground. It is readily apparent that the current consumption is smaller than in the case of a decoder matrix.

These and other features and advantages of the invention will appear more clearly from the detailed description of an example of a preferred embodiment thereof, when considered with the annexed drawings, in which:

FIG. 1 schematically represents a matrix formed according to the invention;

FIG. 2 is a partial wiring diagram of the selection matrix used with a fixed resistor memory;

FIG. 3 shows a variant of a matrix according to the invention.

With reference to FIG. 1, terminal A, fed by a positive voltage source, +V, is connected to a common terminal of *n* switches 1, 2, 3 . . . *n*, the other terminal of each of said switches being connected to one of *n* feed lines 11, 12, 13 . . . 1*n*, whose opposite end is isolated.

Other *m* switches 21, 22, 23 . . . 2*m* each have a terminal connected to ground, and the other connected to an end of one of *m* ground lines 31, 32, 33 . . . 3*m*, whose other end is isolated. Each one of the *n* feed lines 11, 12 . . . 1*n* is connected to every ground line 31, 32 . . . 3*m* through a connecting circuit comprising a resistor R and a diode D. One terminal of the resistor R is connected to a feed line, and the other terminal is connected to the anode of the diode D at point P. The cathode of the diode is connected to a ground line. Each point P is connected by a conductor to one of the *nxm* output terminals: 111, 112 . . . 11*m*; 121, 122, 123 . . . 12*m*; . . . 1*n*1, 1*n*2, 1*n*3 . . . 1*nm*. These output terminals are connected to the external loads C, of which only the one connected to terminal 123 is shown in the figure.

To select the terminal 123 connected to the point P′, which is part of the connecting circuit pertaining to feed line 12 and to ground line 33, the feed switch 2 is closed, all remaining feed switches being retained open and the ground switch 23 is opened, all remaining ground switches being retained closed.

The connecting circuit containing point P′, and connected to the output terminal 123 is thus singled out as the only one connected by resistor R′ to the only feed line which is energized (only switch 2 being closed), and by the diode D′ to the only ground line which is *not* grounded (only switch 23 being opened). Among all points P of the matrix, only point P′ acquires a definite potential higher than ground, because all connecting circuits connected through the resistors R to the feed lines other than line 12 are not energized and the connecting circuits connected by the resistors to line 12 and through a respective diode to ground lines other than lines 23 have the point P maintained at ground potential through the forward resistance of diode D, which is practically zero.

The ground line 33 acquires the same potential as point

P″, but diodes D being reverse biased, prevent points P″ from acquiring the potential of said line.

The current delivered by the source through terminal A flows through switch 2 and is divided between $m-1$ parallel circuits each comprising resistor R, diode D, ground line and closed ground switch to ground, and the circuit comprising resistor R′, point P′, terminal 123, load C, and ground. If the load C is small with respect to resistor R, the current delivered by the source is approximately *m* times the current flowing through the load C.

The current consumption is lower if higher values are used for resistors R, with the upper limit for such value set by the characteristics of the load C. If this load is resistive, as occurs when the fixed memory uses resistors or diodes as connecting elements, the maximum value must be such, as to allow a sufficient current to circulate in the memory and if the load is capacitive, as occurs when the fixed memory uses capacitors as connecting elements, then the maximum value of R is limited by the optimum time constant that is consistent with the required speed of operation of the memory.

FIG. 2 partially represents the wiring diagram of a selection matrix made according to the invention, using transistors as switches, and connected to a fixed resistor memory.

Transistors TA, used as feed switches, are NPN type transistors having the collector connected to the common feed terminal A, the emitter connected to the associated feed line LA, and the transistors TT, used as ground switches, are likewise NPN type transistors having the emitter connected to ground, and the collector connected to the associated ground line LT.

The feed and ground switches are controlled respectively by the control terminals CA and CT, connected to the bases of the respective transistors.

Each feed line is connected to every ground line by means of the connection circuits. In the figure only one of these circuits is shown, and that is the one connected to lines LA′ and LT′, and including resistor R′, diode D′, output terminal U′. Each output terminal U of the selection matrix is connected to an input line LM of the fixed resistor memory. Such input lines are selectively connected by means of resistors RM to output lines LU, which terminate at the output amplifiers AM and the output signals are available at the outputs UM of such amplifiers.

To select LM′ of the fixed storage the terminal CA′ of transistor TA′ is brought to a positive potential sufficiently high to make the transistor conductive, while the control terminals CA of the remaining transistors TA are maintained at 0 (zero) potential. Correspondingly, the control terminal CT′ of transistor TT′ is brought to a blocking voltage so as to make the transistor non-conductive, while all remaining control terminals CT are brought to a voltage high enough to render the remaining transistors TT conductive. Point P′ therefore acquires a relatively high voltage, and a current flows through the input line LM′ of the fixed storage. This current flows to ground through both resistors RM′ and RM″ which, in the example shown in the figure, connect the input line LM′ to both output lines LU′ and LU″, and through the bases and emitters of both output amplifiers AM′ and AM″, causing two output signals to be available at the output terminals UM′ and UM″.

According to the arrangement shown, it is possible, for example, to control the access of a fixed resistor memory having 64 input lines, by a set of 8 by 8 switches. If the value of each of the resistors RM of the fixed resistor memory is 3 ohms, and the maximum current needed by each input line is 10 ma., assuming a value of 30 ohm for the resistor R of the selecting matrix, the maximum current requirement for the source is approximately 80 ma.

The number of ground switches may be further reduced by a modification of the present invention, whereby the connecting circuits contain more than one diode.

FIG. 3 schematically represents a matrix for selecting one line out of 16, using connecting circuits containing two diodes.

Four feed switches 1, 2, 3, and 4 are each connected by a terminal thereof to the common feed terminal A and by the other terminal thereof respectively to four feed lines 5, 6, 7, and 8. Each one of said lines is connected to four connecting circuits consisting, for example, of resistor 71 and diodes 711 and 712, resistor 72, and diodes 721 and 722, resistor 73 and diodes 731 and 732, resistor 74 and diodes 741 and 742. The output terminals U are connected to the points common each to resistor and both associated diodes.

The ground lines are eight in number, connected in pairs and subdivided into two groups. One group, comprising the lines 10 and 12, 14 and 16, is controlled by switches 21 and 22 and the other one, comprising lines 11 and 15, 13 and 17, is controlled respectively by switches 31 and 32.

As shown, each switch may connect a pair of ground lines to ground, as for example switch 21, lines 10 and 12, switch 22, lines 14 and 16, switch 31, lines 11 and 15, switch 32, lines 13 and 17.

Considering only the connection groups connected through the resistors to feed line 7, it may be seen that switch 21 is connected, through lines 10 and 12, to the cathodes of diodes 711 and 721; switch 22 is connected, through lines 14 and 16, to diodes 731 and 741; switch 31 is connected, through lines 11 and 15, to the cathodes of diodes 712 and 732; and switch 32 to the cathodes of diodes 722 and 742. The same arrangement of connections is repeated for the diodes of the other connection groups, connected by the resistors to the other feed lines.

If switch 3 is closed, and the remaining feed switches are opened, only line 7 is fed. If, in the first group of ground switches, switch 21 is closed and switch 22 is open, ground lines 10 and 12 are grounded, and lines 14 and 16 are isolated from ground. Closing switch 32 of the second group of switches, and leaving switch 31 open, ground lines 13 and 17 are grounded, and lines 11 and 15 are isolated from ground.

Among the four connecting groups having a resistor connected to line 7, which is the only feed line to be fed by the common voltage source, only the group comprising resistor 73, connected by diodes 731 and 732 to the lines 14 and 15, is isolated from ground. Therefore, only the output U pertaining to such group acquires definite potential substantially higher than ground, and only this output will be selected.

In this example, 8 switches are required to select one output of sixteen, and the current requirement is approximately four times the current flowing in the load.

The advantage derived from the reduced number of switches is greater if the number of outputs is higher. In general, if N is the number of outputs, the number of switches may be reduced to a minimum value approximately equal to $$3\sqrt[3]{N}$$

and the current requirement is approximately $$\sqrt[3]{N^2}$$

times the current flowing in the load.

It may be convenient to utilize a number of switches greater than the minimal possible, to reduce the current requirement. If N is the number of outputs, and *a* is the number of feed lines and feed switches, each one of which is connected to *c* connecting circuits, than $a \cdot c \geq N$. If the two groups of ground switches, which select a connecting circuit among *c* circuits, have respectively *m* and *p* switches, then $m \cdot p \geq c$. When the total number of switches is $a+m+p$, the current requirement is *c* times the load. The values of *a* and *c*, *m* and *p* may be selected in the most convenient manner, dictated by the imposed conditions.

For example, the select one output from 256 the minimum number of switches is obtained by taking $a$, $m$, and $p$ as close to $$\sqrt[3]{256}=6.35$$

as possible, that is, making $a=7$, $c=37$ ($a.c=259>256$) and $m=7$, $p=6$ ($m.p=42>37$). The number of switches is then 20 and the current requirement is 37 times the load.

Supposing, for example, that $a=16$, $c=16$, $m=4$, then 24 switches are needed, but the current requirement is only 16 times the load.

It is clear that by following the above explained principles, it is possible to build selection matrixes utilizing, for example 3 or more diodes per connecting circuit, thereby obtaining a greater number of outputs with a substantial reduction in the number of switches.

It is further obvious that the current source A need not necessarily be a constant voltage source, but may be an alternating current voltage source. In this event, only the positive half cycles will be applied to the selected output. With this type of circuit the resistors R used in the selection matrix may be replaced by reactive impedance elements or by impedances containing resistive and reactive elements. In particular, they may be replaced by capacitors or by circuits containing resistors and capacitors of conveniently selected values.

A substantial advantage of the proposed arrangement, is the fact that the selecting matrix, including only diodes and resistors, may be fabricated using integrated circuit techniques and, in many cases, may form part of the same integrated unit making up the fixed memory.

What is claimed is:

1. A selection matrix for use with a power source comprising: a plurality of first selection lines, first connection means for selectively connecting each of said first selection lines to one terminal of said power source, a plurality of groups of second selection lines, second connection means for selectively connecting each of said groups to the other terminal of said power source, a plurality of output terminals, each of said output terminals being coupled to one of said first selection lines through an electrical impedance element, each of said output terminals being coupled to a second selection line of each of a plurality of said groups through a unilateral current conducting device, and means for obtaining an output at a preselected one of said output terminals responsive to said first connection means connecting the corresponding coupled first selection line to said power source and said second connection means connecting all of said groups to said power source except the corresponding coupled groups.

2. A selection matrix as specified in claim 1 wherein each electrical impedance element is a resistor.

3. A selection matrix as specified in claim 1 wherein each unidirectional current conductive device is a diode, and is connected in the same sense to said second selection lines.

4. A selection matrix as specified in claim 1 wherein the means for selectively connecting the first selection lines to one terminal of a power source comprise transistor switching means.

5. A selection matrix as specified in claim 1 wherein the means for selectively connecting the second selection lines to the other terminal of said power source comprises transistor switching means.

6. A selection matrix as specified in claim 1 wherein the means for selectively connecting the first selection lines to one terminal of a power source comprise transistor switching means, the unidirectional current conductive devices are diodes and the electrical impedance elements are resistors.

References Cited

UNITED STATES PATENTS

| | | | |
|---|---|---|---|
| 3,107,341 | 10/1963 | Ulmer | 340—166 |
| 3,189,877 | 6/1965 | Pricer et al. | 340—166 X |
| 3,308,433 | 3/1967 | Lochinger | 340—176 X |
| 3,397,388 | 8/1968 | Abramson et al. | 340—166 |

DONALD J. YUSKO, Primary Examiner